United States Patent
Gellert et al.

[11] Patent Number: 6,062,841
[45] Date of Patent: May 16, 2000

[54] SPRUE GATED MULTI-LAYER INJECTION MOLDING APPARATUS

[75] Inventors: Jobst Ulrich Gellert, Georgetown; Denis L. Babin, Acton, both of Canada

[73] Assignee: Mold-Masters Limited, Georgetown, Canada

[21] Appl. No.: 08/969,764

[22] Filed: Nov. 13, 1997

[30] Foreign Application Priority Data

Oct. 23, 1997 [CA] Canada ................................. 2219257

[51] Int. Cl.⁷ .................................................. B29C 45/16
[52] U.S. Cl. ........................................... 425/130; 425/562
[58] Field of Search ..................... 425/130, 564, 425/566, 562

[56] References Cited

U.S. PATENT DOCUMENTS

| | | |
|---|---|---|
| 4,717,324 | 1/1988 | Schad et al. . |
| 4,934,915 | 6/1990 | Kudert et al. ............................. 425/564 |
| 4,990,301 | 2/1991 | Krishnakumar et al. . |
| 5,131,830 | 7/1992 | Orimoto et al. . |
| 5,141,695 | 8/1992 | Nakamura . |

*Primary Examiner*—Tim Heitbrink
*Attorney, Agent, or Firm*—Dalesman & Company

[57] ABSTRACT

Sprue gated injection molding apparatus for molding preforms or other products having two layers of a barrier material such as EVOH or nylon alternating between three layers of another thermal plastic material such as PET. The PET is injected by one injection cylinder into first and third melt passages which branch in a front melt distribution manifold to extend to a number of heated nozzles. The first melt passage extends through a central melt channel in each heated nozzle and the third melt passage extends through an outer annular melt channel surrounding the central melt passage to an aligned gate leading to a cavity. The barrier material is injected by another injection cylinder into a second melt passage which branches in a rear melt distribution manifold to extend to an inner annular melt channel extending between the central melt passage and the outer annular melt channel in each heated nozzle. A single control valve mounted in the first melt passage before it branches in the front melt distribution manifold allows separate control of melt flow through each of the three melt passages during the injection cycle.

19 Claims, 5 Drawing Sheets

SPRUE GATED MULTI-LAYER INJECTION MOLDING APPARATUS

BACKGROUND OF THE INVENTION

This invention relates generally to sprue gated injection molding apparatus for five layer molding and more particularly to such apparatus having two melt passages extending from a common melt source with one of the melt passages having a control valve to control melt flow to a central melt channel in each heated nozzle.

Multi-cavity injection molding apparatus for making five layered protective containers for food or preforms or parisons for beverage bottles are known. Two layers of a barrier material such as ethylene vinyl alcohol copolymer (EVOH) or nylon are molded between two outer layers and a central layer of a polyethylene terephthalate (PET) type material. For instance, U.S. Pat. No. 4,717,324 to Schad et al. which issued Jan. 5, 1988 shows apparatus for sequentially injecting first the PET, then the barrier material and finally the PET again through two different melt channels. While this is satisfactory for some applications, sequential molding has the disadvantage of a relatively lengthy cycle time.

As seen in U.S. Pat. No. 4,990,301 to Krishnakumar et al. which issued Feb. 5, 1991, U.S. Pat. No. 5,131,830 to Orimoto et al. which issued Jul. 21, 1992, and U.S. Pat. No. 5,141,695 to Nakamura which issued Aug. 25, 1992 injection molding apparatus is also known to simultaneously inject multi-layered products, but this apparatus has the disadvantage of requiring a separate melt source and a separate valve for each melt passage.

SUMMARY OF THE INVENTION

Accordingly, it is an object of the present invention to at least partially overcome the disadvantages of the prior art by providing multi-cavity injection molding apparatus for five layer molding having only two melt sources and only one control valve.

To this end, in one of its aspects, the invention provides multi-cavity sprue gated injection molding apparatus for five layer molding having one or more melt distribution manifolds with a front face and a plurality of heated nozzles mounted in a mold. Each heated nozzle has a rear end abutting against the melt distribution manifold and a front end adjacent a gate leading to a cavity in the mold. Each heated nozzle has first, second and third melt channels extending therethrough from the rear end to the front end. A first melt passage for conveying melt from a first melt source branches in the melt distribution manifold and extends through the first melt channel in each heated nozzle to the gate. A second melt passage for conveying melt from a second melt source branches in the melt distribution manifold and extends through the second melt channel in each heated nozzle to the gate. A third melt passage for conveying melt from the first melt source branches in the melt distribution manifold and extends through the third melt channel in each heated nozzle to the gate. The first melt passage has a valve therein upstream of the branching to control melt flow to the first melt channel in each heated nozzle according to a predetermined cycle.

In another of its aspects, the invention provides a method of continuously injection molding five layer products in a multi-cavity injection molding apparatus having a melt distribution manifold and a plurality of heated nozzles mounted in a mold. Each heated nozzle has a rear end abutting against the melt distribution manifold and a front end adjacent a gate leading to a cavity in the mold. Each heated nozzle has a central melt channel extending therethrough from the rear end to the front end, an inner annular melt channel extending around the central melt channel to the front end and an outer annular melt channel extending around the inner annular melt channel to the front end. A first melt passage extending from a common inlet in the melt distribution manifold and having actuated valve means therein branches in the melt distribution manifold and extends through the central melt channel in each heated nozzle to the gate. A second melt passage branches in the melt distribution manifold and extends through the inner annular melt channel in each heated nozzle to the gate. A third melt passage also extending from the common inlet in the melt distribution manifold branches in the melt distribution manifold and extends through the outer annular melt channel in each heated nozzle to the gate. The method comprises the steps of, with the valve means in the first melt passage in the closed position, injecting a first molten material from a first melt source through the common inlet to the first and third melt passages, whereby the first molten material flows in the third melt passage through the outer annular channel in each heated nozzle and the aligned gated into the cavities. After a predetermined quantity of the first molten material has been injected into the cavities, simultaneously injecting a second molten material from a second melt source into the cavities through the second melt passage, whereby the second molten material flows through the inner annular melt channel in each heated nozzle and the aligned gate and splits the first molten material flowing from the outer annular channel in each heated nozzle to form two outer layers of the first material in each of the cavities. Then after flow of the second molten material into the cavities has been established, actuating the valve means in the first melt passage to the open position to simultaneously inject first molten material from the first melt source into the cavities through the first melt passage, whereby the first molten material flows through the central melt channel in each heated nozzle and the aligned gate and splits the second molten material flowing from the inner annular channel in each heated nozzle to form a central layer of the first material between two intermediate layers of the second material in each of the cavities. When the cavities are nearly full, the injection of the second material through the second melt passage is discontinued, while the injection of the first material is continued until the cavities are full. After a cooling period, the mold is opened to eject the molded products. Finally, the mold is closed after ejection of the molded products.

Further objects and advantages of the invention will appear from the following description taken together with the accompanying drawings.

DETAILED DESCRIPTION OF THE INVENTION

Figure 1:
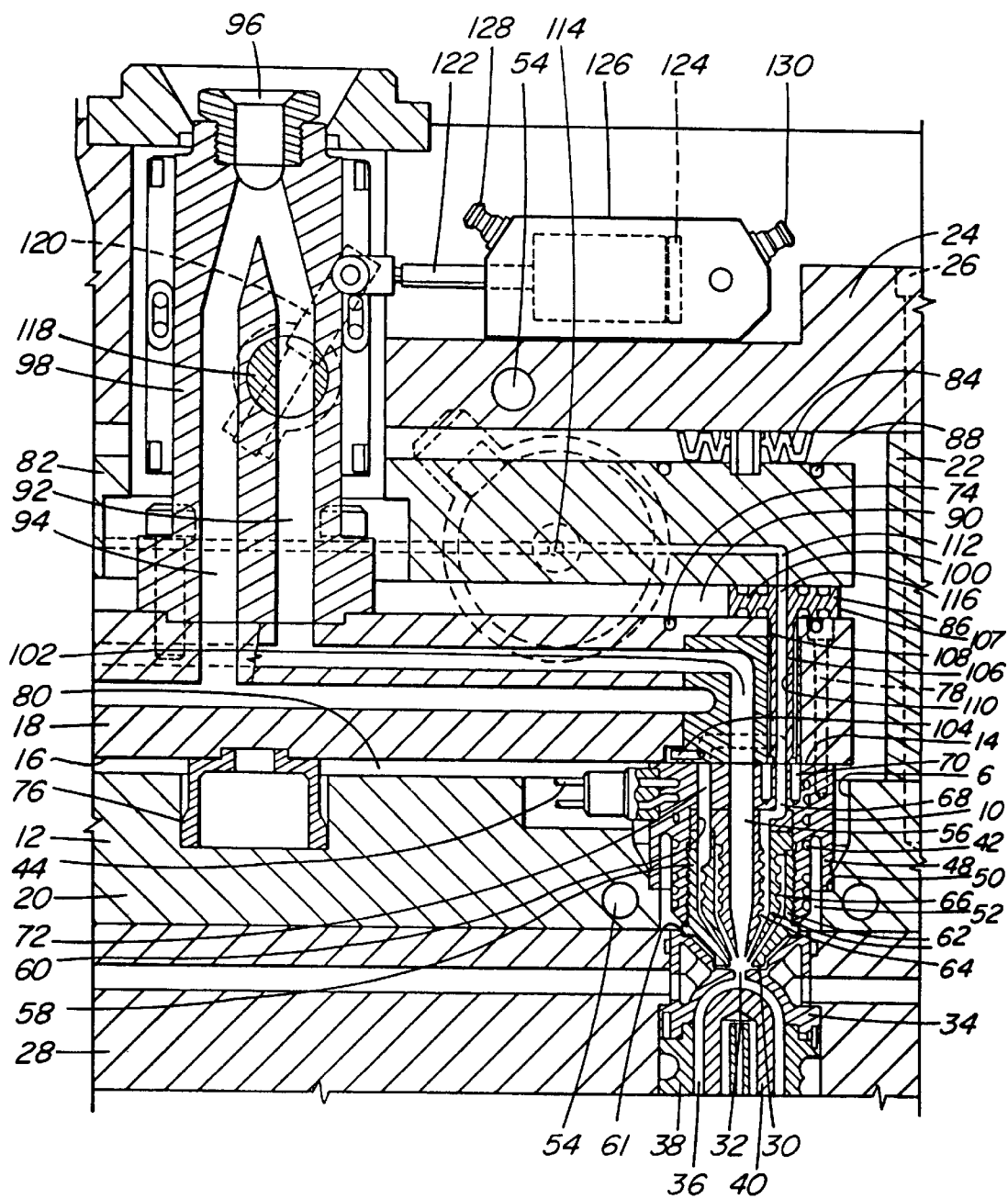
FIG. 1 is a sectional view of a portion of multi-cavity injection molding apparatus for five layer molding according to one embodiment of the invention.
Figure 2:
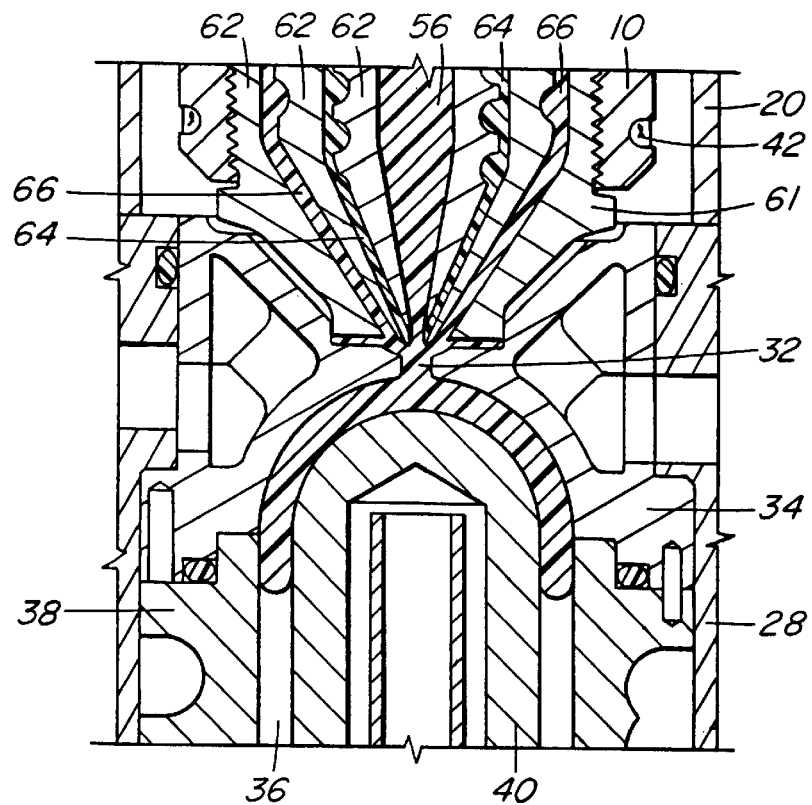
FIGS. 2–5 are sectional views of a portion of FIG. 1 showing the sequence of injecting a five layer preform.

Reference is first made to FIG. 1 which shows a portion of multi-cavity sprue gated injection molding apparatus for molding five layer preforms or other products by a combination of sequential and simultaneous coinjection. A number of heated nozzles 10 are mounted in a mold 12 with a rear end 14 abutting against the front face 16 of a front steel melt distribution manifold 18. While the mold can have a greater number of plates depending upon the application, in this case, only a nozzle retainer plate 20, a manifold retainer plate 22 and a cylinder plate 24 secured together by bolts 26, as well as a cavity retainer plate 28 are shown for ease of illustration. The front tip end 30 of each heated nozzle 10 is aligned with a gate 32 extending through a cooled gate insert 34 to a cavity 36. This cavity 36 for making beverage bottle preforms extends between a cavity insert 38 and the mold core 40 in a conventional manner.

Each nozzle 10 is heated, preferably by an integral electrical heating element 42 having a terminal 44. Each heated nozzle 10 is seated in an opening 46 in the nozzle retainer plate 20 with a rear collar portion 48 of each heated nozzle 10 received in a circular locating seat 50 extending around the opening 46. This provides an insulative air space 52 between the heated nozzle 10 and the surrounding mold 12 which is cooled by pumping cooling water through cooling conduits 54. Each heated nozzle 10 has a central melt channel 56 extending from its rear end 14 to its front end 30.

In the configuration shown, each heated nozzle 10 has an insert portion 58 which is secured in a seat 60 by a threaded nozzle seal 61 which is screwed into place and forms the front tip end 30 of the heated nozzle 10. As can be seen, the insert portion 50 is made of several pieces 62 which fit together to form the central melt channel, an inner annular melt channel 64 extending around the central melt channel 56 to the front end 30, and an outer annular melt channel 66 extending around the inner annular melt channel 64 and the central melt channel 56 to the front end 30. In this configuration, the heated nozzle 10 has a single melt bore 68 extending from its rear end 14 to connect to the inner annular melt channel 64. A circle of spaced holes 70 are drilled in the rear end 14 of the heated nozzle 10 around the melt bore 68 to provide thermal separation for the melt flowing through the melt bore 68. The configuration shown also has four spaced melt bores 72 extending from the rear end 14 of the heated nozzle 10 to the outer annular melt channel 66.

The front melt distribution manifold 18 is heated by an electrical heating element 74. It is preferably located by a central locating ring 76 and screws 78 extending into each heated nozzle 10 to have an insulative air space 80 extending between it and the surrounding cooled mold 12. A rear steel melt distribution manifold 82 is mounted in the mold 12 by a number of insulative and resilient spacers 84 extending between it and the cylinder plate 24 to extend parallel to the front melt distribution manifold 18. As can be seen, the two manifolds 18, 82 are separated by thermal insulating melt transfer bushings 86 positioned between them. As described in more detail below, the rear melt distribution manifold 82 is heated by an integral electrical heating element 88 to a lower operating temperature than the front melt distribution manifold 18, and the air space 90 provided by the thermal insulating melt transfer bushings 86 between the two manifolds 18, 82 provides thermal separation between them.

A first melt passage 92 and a third melt passage 94 extend from a common inlet 96 through a cylindrical manifold extension or sprue bushing 98 and both branch in the front melt distribution manifold 18, and, in this configuration, extend through a melt dividing bushing 100 seated in the front face 16 of the front melt distribution manifold 18 in alignment with each heated nozzle 10. The melt dividing bushing 100 is made of three steel layers integrally brazed together as described in co-pending Canadian Application Serial No. 2,219,054 entitled, "Injection Molding Apparatus Having Melt Dividing Bushings" filed concurrently herewith. In this configuration, the first melt passage 92 extends through an L-shaped conduit 102 in the melt dividing bushing 100 in alignment with the central melt channel 56 through each heated nozzle 10 and the third melt passage 94 branches in the melt dividing bushing 100 to four holes 104, each aligned with one of the four melt bores 72 extending from the rear end 14 of each heated nozzle 10 to the outer annular melt channel 66. In this configuration, each thermal insulating melt transfer bushing 86 has an elongated stem portion 106 extending forwardly from a rear head portion 107 through a bore 108 in the front melt distribution manifold 18 and an off center bore 110 in the melt dividing bushing 100. A second melt passage 112 extends from a second inlet 114 and branches in the rear melt distribution manifold 82 to extend through a central bore 116 in each melt transfer bushing 86 to the aligned melt bore 68 extending from the rear end 14 of each heated nozzle 10 to the inner annular melt channel 64.

A control valve 118 according to the invention is mounted in the first melt passage 92 in the cylindrical extension or sprue bushing 98 leading to front melt distribution manifold 18. A link 120 extending from the control valve 118 is attached to a connecting rod 122 extending from a piston 124 in a cylinder 126 mounted in the cylinder plate 24. The piston 124 is driven by pneumatic pressure applied through inlets 128, 130 to drive the control valve 118 between open and closed positions according to a predetermined cycle. Of course, in other embodiments, the control valve 118 can be operated in any of the techniques known in the art, e.g., hydraulically actuated rather than pneumatically actuated, or other types of valves can be used.

In use, the injection molding system is assembled as shown in FIG. 1 and operates to form five layer preforms or other products with two layers of barrier material alternating between three layers of a polyethylene terephthalate (PET) type material as follows. The barrier material is a material such as ethylene vinyl alcohol copolymer (EVOH) or nylon. First, electrical power is applied to the heating element 74 in the front melt distribution manifold 18 and the heating elements 42 in the heated nozzles 10 to heat them to an operating temperature the material to be injected in the first and third melt passages 92, 94 which is preferably PET requiring an operating temperature of about 565° F. Electrical power is also applied to the heating element 88 in the rear melt distribution manifold 82 to heat it to an operating temperature of the material to be injected in the second melt passage 112 of about 400° F. Water is applied to the cooling conduits 54 to cool the molds 12 and the gate inserts 34. Hot pressurized melt is then injected into the common inlet 96 in the front melt distribution manifold 18 and the second inlet 114 in the rear melt distribution manifold 82 according to a predetermined injection cycle.

Reference is now also made to FIGS. 2–5 to describe the sequence of operation of the injection cycle. First, pneumatic pressure is applied to the cylinder 126 to rotate the control valve 118 to the closed position. Pressurized melt such as a polyethylene terephthalate (PET) type material is injected through the common inlet 96 in the cylindrical extension or sprue bushing 98 of the front melt distribution manifold 18 by an injection cylinder (not shown). With the control valve 118 in the first melt passage 92 in the closed position, the melt flows through the third melt passage 94 which branches in the front melt distribution manifold 18 and extends through the outer annular melt channels 66 in each heated nozzle 10 to the aligned gate 32 leading to a cavity 36. After a predetermined quantity of PET has been injected into the cavity 36 and while PET is continuing to be injected through the outer annular melt channel 66, another pressurized melt which is a barrier material such as ethylene vinyl alcohol copolymer (EVOH) or nylon is coinjected by another injection cylinder (not shown) through the second inlet 114 and flows through to the second melt passage 112 which branches in the rear melt distribution manifold 82 and extends through the inner annular melt channel 64 in each heated nozzle 10 to the aligned gate 32 leading to the cavity 36.

Figure 3:
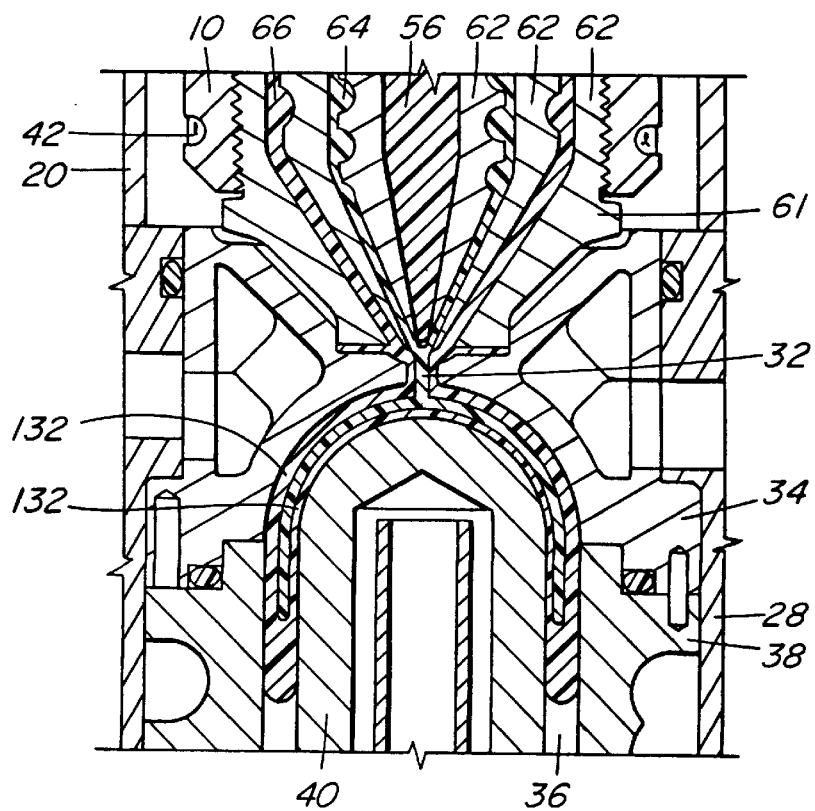

As seen in FIG. 3, the flow of the barrier material splits the flow of PET into two outer layers 132. After the simultaneous flow of PET through the outer annular melt channels 66 and the barrier material through the inner melt channels 64 has been established, pneumatic pressure is reversed to the cylinder 126 to rotate the control valve 118 to the open position. Then the pressurized PET also flows through the first melt passage 92 which branches in the front melt distribution manifold 18 and extends through the central melt channel 56 in each heated nozzle 10 to the aligned gate 32 and into the cavity 36.

Figure 4:
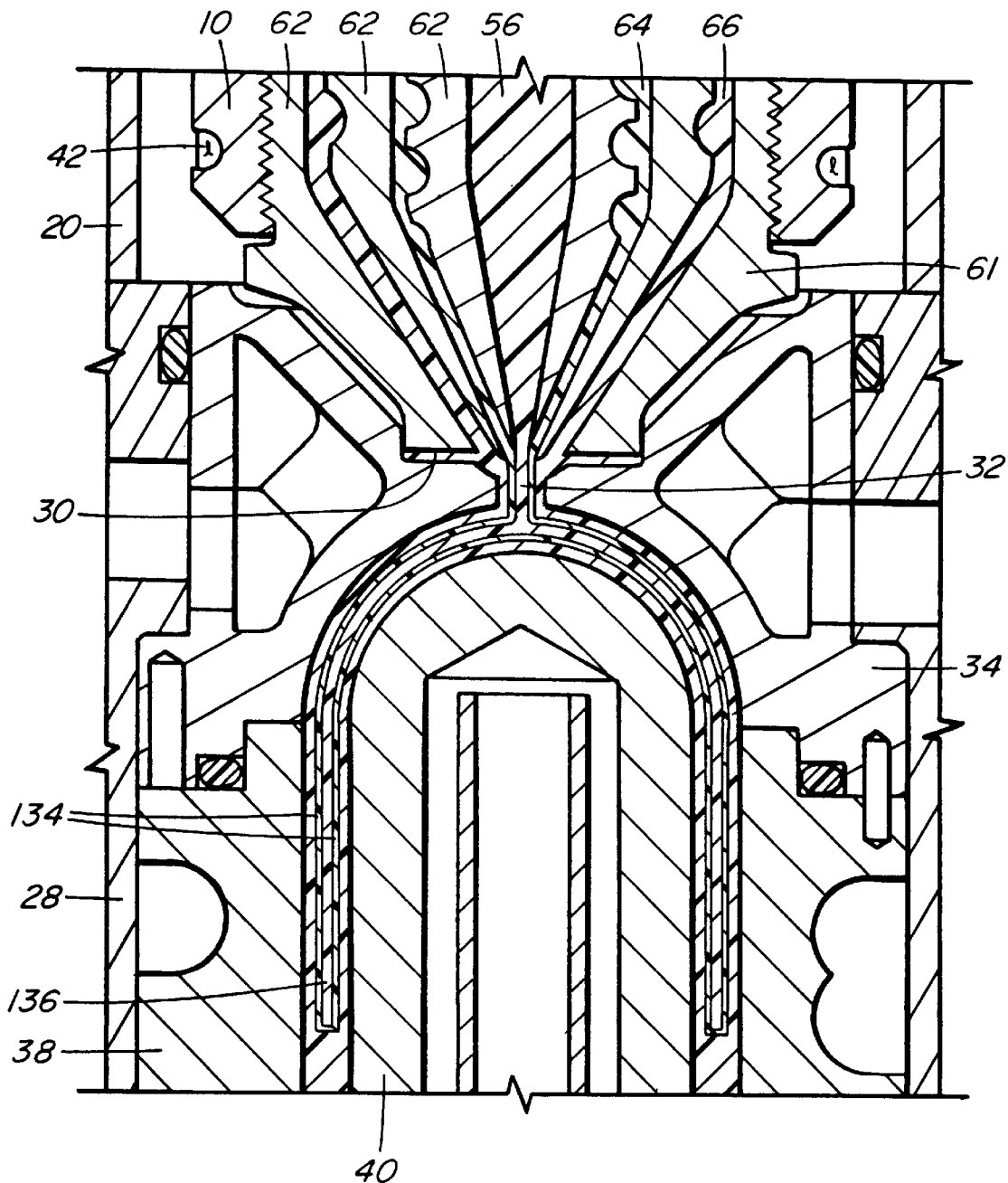
Figure 5:
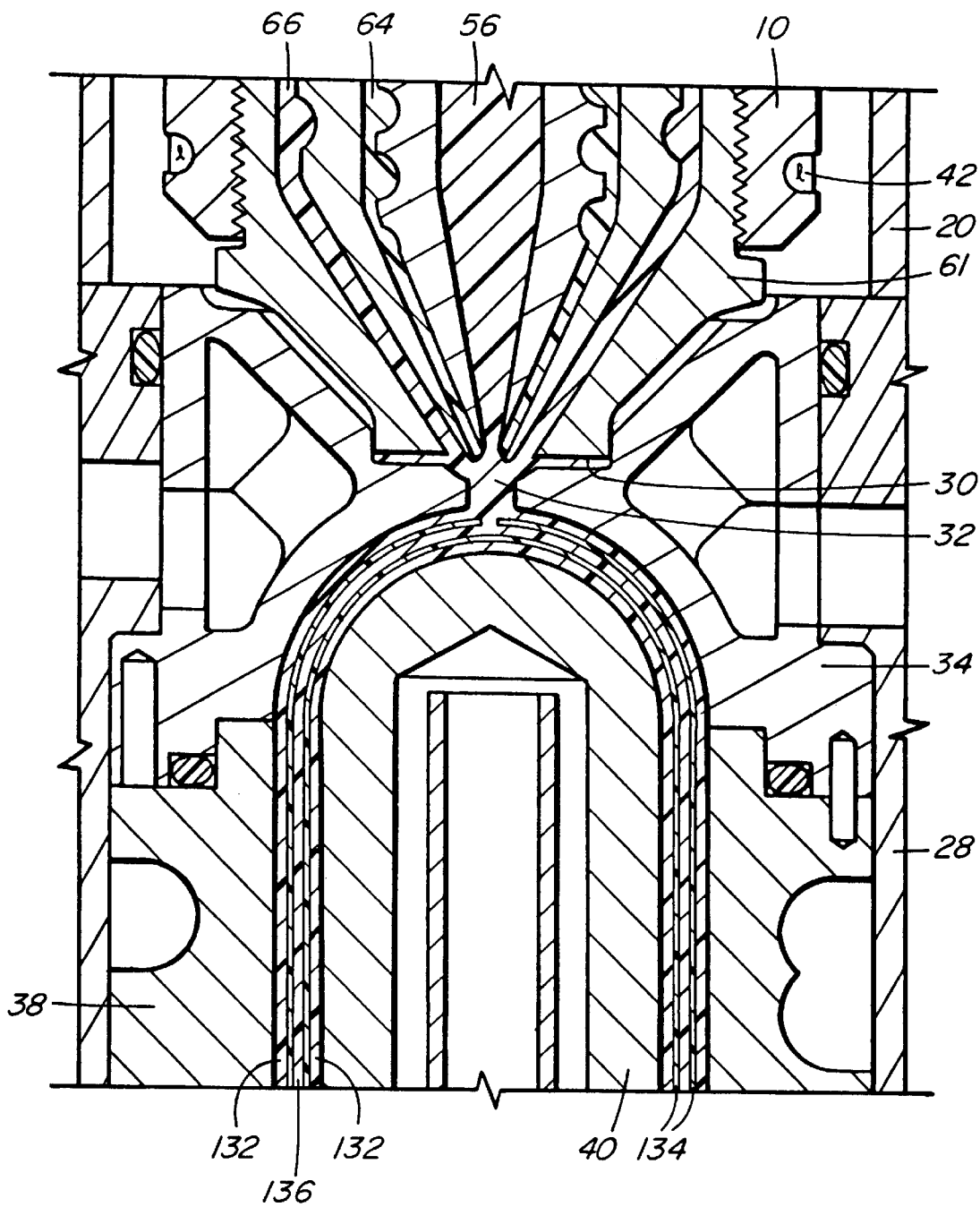

As seen in FIG. 4, this flow of PET through the first melt passage 92, in turn, splits the flow of the barrier material into two intermediate layers 134 of the barrier material on both sides of a central PET layer 136. When the cavities 36 are almost filled, pneumatic pressure is again reversed to the cylinder 126 to rotate the control valve 118 back to the closed position. This shuts off the flow of PET through the central melt channel 56, thereby terminating the splitting of the barrier material flow and allowing the barrier material to establish a continuous sealed flow. Then the injection pressure of the barrier material is released to stop its flow through the inner annular melt channels 76 in the heated nozzles 10 and another small quantity of PET is injected to complete filling of the cavities 36. Injection pressure of the PET is then released and, after a short cooling period, the mold 12 is opened for ejection.

After ejection, the mold 12 is closed and the cycle is repeated continuously every 15 to 30 seconds with a frequency depending upon the wall thickness and number and size of cavities 36 and the exact materials being molded. Thus, as can be seen, the provision of the control valve 118 mounted in the first melt passage 92 before it branches in the front melt distribution manifold 18 allows separate control of melt flow through each of the three melt passages during the injection cycle.

Figure 6:
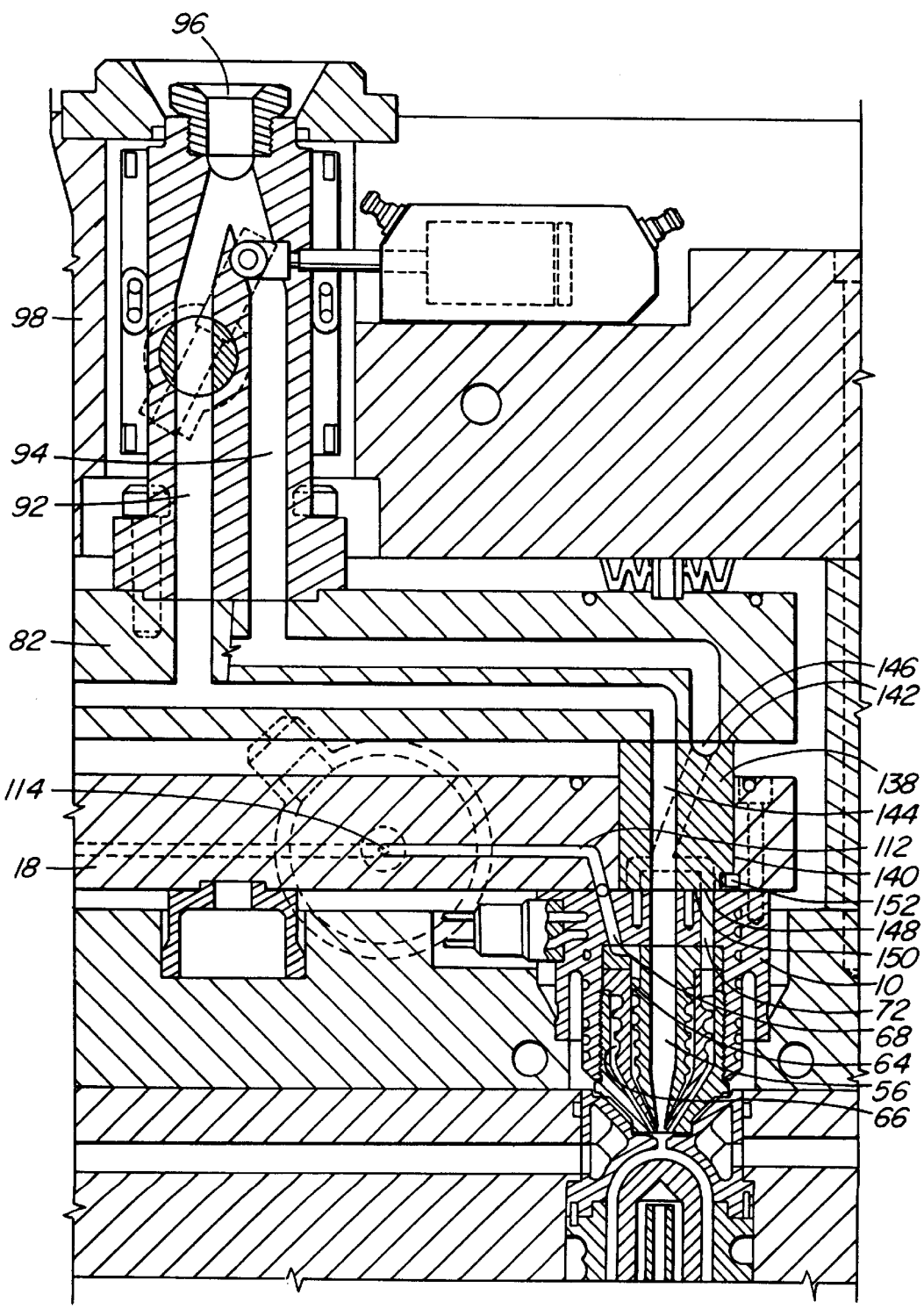
FIG. 6 is a sectional view of a portion of a multi-cavity injection molding apparatus for five layer molding according to another embodiment of the invention.

Reference is now made to FIG. 6 showing injection molding apparatus according to another embodiment of the invention for molding five layer preforms or other products by a combination of sequential and simultaneous coinjection. As many of the elements are the same or similar to those described above, not all elements common to both embodiments are described again and those that are described again have the same reference numerals as before. In this case, the rear melt distribution manifold 82 rather than the front melt distribution manifold 18 has the manifold extension or sprue bushing 98. Thus, the first and third melt passages 92, 94 extending from the common inlet 96 in the manifold extension or sprue bushing 98 extend through the rear melt distribution manifold 82 rather than the front melt distribution manifold 18. Furthermore, the second melt passage 112 extends from the second inlet 114 through the front melt distribution manifold 18 rather than the rear melt distribution manifold 82.

As can be seen, a melt transfer and dividing bushing 138 is seated behind each heated nozzle 10 in a cylindrical opening 140 through the front melt distribution manifold 18 with its rear end 142 abutting against the rear melt distribution manifold 82. The first melt passage 92 branches in the rear melt distribution manifold 82 and extends through an off-center bore 144 which extends through each melt transfer and dividing bushing 138 in alignment with the central melt channel 56 in the adjacent heated nozzle 10. The melt transfer and dividing bushing 138 is made of two steel layers integrally brazed together, and the third melt passage 94 from the rear melt distribution manifold 82 branches in the melt transfer and dividing bushing 138 from a single inlet 146 at its rear end 142 to four spaced outlets 148 at its front end 150. A small dowel 152 extends from the melt transfer and dividing bushing 138 outwardly into the front melt distribution manifold 18 to locate the melt transfer and dividing bushing 138 with the four spaced outlets 148 in alignment with the four melt bores 72 extending from the rear end 14 of the heated nozzle 10 to the outer annular melt channel 66. The second melt passage 112 which branches in the front melt distribution manifold 118 extends through the single melt bore 68 extending from the rear end 14 of the heated nozzle 10 to the inner annular melt channel 64. The operation of this embodiment of the invention is the same as that described above, and need not be repeated.

While the description of the sprue gated injection molding apparatus for five layer molding has been given with respect to preferred embodiments, it will be evident that various modifications are possible without departing from the scope of the invention as understood by those skilled in the art and as defined in the following claims. For instance, other materials having suitable characteristics can be used rather than PET, EVOH and nylon.

The embodiments of the invention in which an exclusive property or privilege is claimed is defined as follows:

1. In a multi-cavity sprue gated injection molding apparatus having a plurality of melt distribution manifolds and a plurality of heated nozzles mounted in a mold, each heated nozzle having a rear end abutting against one of the melt distribution manifolds and a front end adjacent a gate leading to a cavity in the mold, each heated nozzle having first, second and third melt channels extending therethrough from the rear end to the front end, a first melt passage for conveying melt from a first melt source branching in one of the melt distribution manifolds and extending through the first melt channel in each heated nozzle to the gate, a second melt passage for conveying melt from a second melt source branching in one of the melt distribution manifolds and extending through the second melt channel in each heated nozzle to the gate, and a third melt passage for conveying melt from the first melt source branching in one of the melt distribution manifolds and extending through the third melt channel in each heated nozzle to the gate, the improvement further comprising;

a sprue bushing extending to one of the melt distribution manifolds with the first and third melt channels extending through the sprue bushing and said one of the melt distribution manifolds, valve means mounted in the sprue bushing and actuating means for actuating the valve means between open and closed positions to control melt flow through the first melt channel in each heated nozzle according to a predetermined cycle.

2. Injection molding apparatus as claimed in claim 1 wherein the first melt channel through each heated nozzle is a central melt channel, the second melt channel through each heated nozzle includes an inner annular melt channel extending around the central melt channel to the front end, and the third melt channel through each heated nozzle includes an outer annular melt channel extending around the inner annular melt channel to the front end.

3. Injection molding apparatus as claimed in claim 2 wherein the melt from the first source is polyethylene terephthalate (PET).

4. Injection molding apparatus as claimed in claim 3 wherein the melt from the second source is ethylene vinyl alcohol copolymer (EVOH).

5. Injection molding apparatus as claimed in claim 3 wherein the melt from the second source is nylon.

6. Injection molding apparatus as claimed in claim 2 wherein the first and third melt passages from the first melt source branch in a front melt distribution manifold mounted in the mold and the second melt passage from the second melt source branches in a rear melt distribution manifold mounted in the mold.

7. Injection molding apparatus as claimed in claim 6 wherein the first and third melt passages extend from a common inlet in the sprue bushing.

8. Injection molding apparatus as claimed in claim 7 wherein the front melt distribution manifold extends substantially parallel to and is spaced a predetermined distance from the rear melt distribution manifold and the second melt passage from the second melt source branches in the rear melt distribution manifold and then extends through melt bores in the front melt distribution manifold.

9. Injection molding apparatus as claimed in claim 8 wherein each heated nozzle has at least one melt bore extending from the rear end to the inner annular melt channel and at least one melt bore extending from the rear end to the outer annular melt channel, wherein the second melt passage from the second melt source branching in the rear melt distribution manifold and extending through the melt bores in the front melt distribution manifold extends through the at least one melt bore extending from the rear end to the inner annular melt channel in each heated nozzle.

10. Injection molding apparatus as claimed in claim 9 wherein the third melt passage branching in the front melt distribution manifold extends through the at least one melt bore extending from the rear end to the outer annular melt channel in each heated nozzle.

11. Injection molding apparatus as claimed in claim 10 wherein the valve means comprises a control valve mounted in the first melt passage in the sprue bushing with actuating mechanism to drive the control valve between open and closed positions according to the predetermined cycle.

12. Injection molding apparatus as claimed in claim 2 wherein the first and third melt passages from the first melt source branch in a rear melt distribution manifold mounted in the mold and the second melt passage from the second melt source branches in a front melt distribution manifold mounted in the mold.

13. Injection molding apparatus as claimed in claim 12 wherein the first and third melt passages extend from a common inlet in the sprue bushing.

14. Injection molding apparatus as claimed in claim 13 wherein the front melt distribution manifold extends substantially parallel to and is spaced a predetermined distance from the rear melt distribution manifold and the first and third melt passages from the first melt source branch in the rear melt distribution manifold and then extends through melt bores in the front melt distribution manifold.

15. Injection molding apparatus as claimed in claim 14 wherein each heated nozzle has at least one melt bore extending from the rear end to the inner annular melt channel and at least one melt bore extending from the rear end to the outer annular melt channel, wherein the second melt passage from the second melt source branching in the front melt distribution manifold extends through the at least one melt bore extending from the rear end to the inner annular melt channel in each heated nozzle.

16. Injection molding apparatus as claimed in claim 15 wherein the third melt passage branching in the rear melt distribution manifold and extending through the melt bores in the front melt distribution manifold extend through the at least one melt bore extending from the rear end to the outer annular melt channel in each heated nozzle.

17. Injection molding apparatus as claimed in claim 16 wherein the valve means comprises a control valve mounted in the first melt passage in the sprue bushing with actuating mechanism to drive the control valve between open and closed positions according to the predetermined cycle.

18. An injection molding apparatus comprising a first melt distribution manifold mounted in a mold between a sprue bushing and a plurality of heated nozzles, first and third melt passages extending through the first melt distribution manifold for conveying a first melt from a first melt source to a plurality of gates and a second melt passage for conveying a second melt from a second melt source to said gates, said sprue bushing having valve means to control the flow of said first melt through one of said first and third melt passages.

19. An injection molding apparatus as claimed in claim 18 further comprising a second melt distribution manifold through which the second melt passage extends.

* * * * *